(12) United States Patent
Ho et al.

(10) Patent No.: US 7,170,856 B1
(45) Date of Patent: Jan. 30, 2007

(54) JITTER BUFFER FOR A CIRCUIT EMULATION SERVICE OVER AN INTERNET PROTOCOL NETWORK

(75) Inventors: Chi Fai Ho, Sunnyvale, CA (US); Raghu R. Kondapalli, Sunnyvale, CA (US); Lalit Merani, Santa Clara, CA (US); Ravi Bail Bhat, Malleswaram (IN); Prabhas Kejriwal, Palo Alto, CA (US); Shashank Merchant, Santa Clara, CA (US)

(73) Assignee: Nokia Inc., Irving, TX (US)

( * ) Notice: Subject to any disclaimer, the term of this patent is extended or adjusted under 35 U.S.C. 154(b) by 0 days.

(21) Appl. No.: 09/569,540

(22) Filed: May 12, 2000

Related U.S. Application Data

(63) Continuation-in-part of application No. 09/378,201, filed on Aug. 19, 1999.

(51) Int. Cl.
*H04J 1/16* (2006.01)
*H04L 12/66* (2006.01)
*H04L 12/28* (2006.01)
*G06F 3/00* (2006.01)

(52) U.S. Cl. .................. 370/230; 370/356; 370/412; 710/52

(58) Field of Classification Search ........ 370/229–230, 370/412, 413, 351–356, 503, 506; 704/278, 704/503
See application file for complete search history.

(56) References Cited

U.S. PATENT DOCUMENTS

| | | | |
|---|---|---|---|
| 5,563,891 A * | 10/1996 | Wang | 370/505 |
| 5,600,641 A * | 2/1997 | Duault et al. | 370/400 |
| 5,699,481 A * | 12/1997 | Shlomot et al. | 704/228 |
| 5,881,245 A * | 3/1999 | Thompson | 709/219 |
| 5,999,518 A | 12/1999 | Nattkemper et al. | |
| 6,064,651 A | 5/2000 | Rogers et al. | |
| 6,094,437 A | 7/2000 | Loehndorf, Jr. et al. | |
| 6,157,614 A | 12/2000 | Pasternak et al. | |
| 6,169,735 B1 | 1/2001 | Allen, Jr. et al. | |
| 6,377,931 B1 * | 4/2002 | Shlomot | 704/503 |
| 6,389,032 B1 * | 5/2002 | Cohen | 370/412 |
| 6,438,612 B1 | 8/2002 | Ylonen et al. | |
| 6,463,486 B1 * | 10/2002 | Parry et al. | 710/52 |
| 6,747,999 B1 * | 6/2004 | Grosberg et al. | 370/516 |

FOREIGN PATENT DOCUMENTS

| | | |
|---|---|---|
| EP | 0 691 769 A1 | 1/1996 |
| EP | 0 921 666 A2 | 6/1999 |
| WO | WO 97/27692 | 7/1997 |

OTHER PUBLICATIONS

Noro et al. "Circuit Emulation over IP Networks", Feb. 1999.*

(Continued)

*Primary Examiner*—Chi Pham
*Assistant Examiner*—Melanie Jagannathan
(74) *Attorney, Agent, or Firm*—Squire, Sanders & Dempsey L.L.P.

(57) ABSTRACT

A jitter buffer receives a plurality of data packets comprising a circuit emulation service over internet protocol (CESIP), buffers the plurality of data packets, and plays data from the plurality of data packets at a constant bit rate corresponding to the CESIP.

2 Claims, 13 Drawing Sheets

OTHER PUBLICATIONS

PCT Notification of Transmittal of The International Search Report or The Declaration for PCT Application No. PCT/US00/17152 Containing International Search Report (Sep. 22, 2000).

Ruffler, D. et al, "A Smart Node Architecture Linking Telephony With the Internet," Proceedings of International Conference on Computer Communication, pp. 77-81, XP-000753882, ISBN 2-7261-1104-1 (Nov. 18, 1997).

Townsley, W. M., "Layer Two Tunneling Protocol 'L2TP', " Network Working Group, Internet Draft, http://www.townsley.net/mark/12tp/12tp-latest.txt (Jun. 1999).

"Circuit Emulation Service Interoperability Specification," The ATM Form Technical Committee, AF-SAA-0032.000 (Sep. 1995).

"Circuit Emulation Service Interoperability Specification Version 2.0," The ATM Form Technical Commitee, af-vtoa-0078.000, (Jan. 1997).

* cited by examiner

| TIME | T0 | T1 | T2 | T3 | T4 | T5 | T6 | T7 | T8 | T9 | T10 | T11 | T12 | T13 | T14 | ... |
|---|---|---|---|---|---|---|---|---|---|---|---|---|---|---|---|---|
| RECEIVED PACKET SEQUENCE NUMBER | NONE | 3 | 2 | 4 | 5 | 1 DROPPED | 6,7,8 | 9,1,2,3 | 5 | 4,6,7,8 | NONE | NONE | NONE | NONE | 9 | |
| HIGH RECEIVE POINTER | 1 | 3 | 3 | 4 | 5 | 5 | 8 | 3 | 5 | 8 | 8 | 8 | 8 | 8 | 9 | |
| PLAY POINTER | 1 | 1 | 1 | 1 | 1 | 2 | 3 | 4 | 4 | 4 | 5 | 6 | 7 | 8 | 8 | |
| DATA PLAYED | NONE | NONE | NONE | NONE | ALARM | 2 | 3 | ALARM | ALARM | 4 | 5 | 6 | 7 | 8 | ALARM | |
| SLOTS BETWEEN POINTERS | 0 | 2 | 2 | 3 | 4 | 3 | 5 | 8 | 1 | 4 | 3 | 2 | 1 | 0 | 1 | |

WAIT → PLAY → FLUSH WAIT BEGIN → EMPTY WAIT →

FIG.12

LOW THRESHOLD = 4
HIGH THRESHOLD = 8
RANGE OF SEQUENCE NUMBERS = 9
NUMBER OF BUFFER SLOTS = 9

JITTER BUFFER FOR A CIRCUIT EMULATION SERVICE OVER AN INTERNET PROTOCOL NETWORK

RELATED CASE

This is a Continuation-in-Part of U.S. application Ser. No. 09/378,201, filed on Aug. 19, 1999, titled "Circuit Emulation Service over an Internet Protocol Network."

FIELD OF THE INVENTION

The present invention pertains to the field of networking. More particularly, this invention relates to circuit emulation services over an internet protocol (IP) network.

BACKGROUND OF THE INVENTION

Over the years, a wide variety of networks have been developed to carry various types of information. Early networks were telephone networks designed with voice communications in mind. These networks were, and still are, primarily circuit-based networks. In a circuit-based network, each call establishes a dedicated, point-to-point connection through the network which, for instance, allows people at both ends of a telephone call to speak and listen at the same time.

A circuit remains open for the entire duration of a call even if no one is speaking. In which case, a large portion of a circuit's bandwidth, or capacity to carry information, is wasted on silence, or meaningless data. Time Division Multiplexing (TDM) is a common circuit-based technology. In TDM, analog signals are digitally coded and multiplexed in time over circuits at a constant bit rate.

In recent decades, the wide spread use of computers has led to the development of additional types of networks. These networks have been designed with data communications in mind and are primarily packet-based networks. In a packet-based network, a call may consist of a stream of data sent from one computer to another. The stream of data is divided up into packets before it enters the network. At the destination, the stream of data is re-assembled from the packets.

A packet-based call does not require a dedicated connection through the network. Instead, packets from many different calls can share the same bandwidth. That is, packets from one call can be inserted into spaces between packets from other calls. In which case, packet-based networks efficiently utilize much more network bandwidth than circuit-based networks, making packet-based networks particularly suited to handle the large volumes of data traffic.

Packet-based networks, however, normally do not work well for time critical transmissions such as voice. For instance, in packet-based networks, packets may experience delay variations while traveling through the network. As a result, packets are rarely received at a constant bit rate. In data communications, delay variations between packets usually do not matter. A computer can just wait for a complete set of packets to arrive before processing the data. For time critical transmissions however, delay variations can have a significant impact on the quality of the call. In which case, circuit-based networks like TDM are generally better suited for constant bit rate, time critical transmissions such as voice.

Since packet-based and circuit-based networks are suited to different kinds of data, network carriers often have to maintain more than one kind of network to satisfy client needs. A carrier may need to maintain TDM for voice and/or video, as well as packet-based networks such as frame relay, ATM (asynchronous transfer mode), and IP (internet protocol) for data. In order to reduce the number of networks that must be supported, a network solution is needed that can provide the advantages of both a circuit-based, constant bit rate service and a packet-based, high bandwidth utilization service.

One approach offered by an industry cooperation group, The ATM Forum, is CES (circuit emulation service) over ATM. CES over ATM is described in "Circuit Emulation Service Interoperability Specification," AF-SAA-0032.000, published September 1995, and "Circuit Emulation Service Interoperability Specification Version 2.0," AF-VTOA-0078.000, published January 1997, both available from The ATM forum at $\leq$http://www.atmforum.com$\geq$. CES over ATM establishes a logical path through the ATM network. In this respect, CES over ATM is similar to TDM in that all the data in a circuit follows the same point-to-point path. With a common path, there should be no out-of-order packets.

An ATM path can accommodate multiple circuits. Depending on a data rate needed for a given circuit, different amounts of bandwidth can be assigned to different circuits in a path. As a result, delay variations between packets should be greatly reduced.

Theoretically, CES over ATM eliminates the need for multiple networks because it allows ATM to handle regular data as well as constant bit rate data. ATM, however, has a number of disadvantages and limitations. For instance, ATM is not as widely spread as some other networks. The smaller ATM market share has lead to less research and development directed to future improvements, gaps in ATM availability, especially between regions serviced by different network carriers, and more expensive ATM hardware and technical support. Other limitations include security, in that ATM packet headers cannot be encrypted, and failure recovery, in that data is often lost and re-routing is slow compared to some other networks. For these and numerous additional reasons, CES over ATM is less than an ideal network solution for constant bit rate data transmission.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

FIG. 12 provides an example of a jitter buffer.

DETAILED DESCRIPTION

Figure 1:
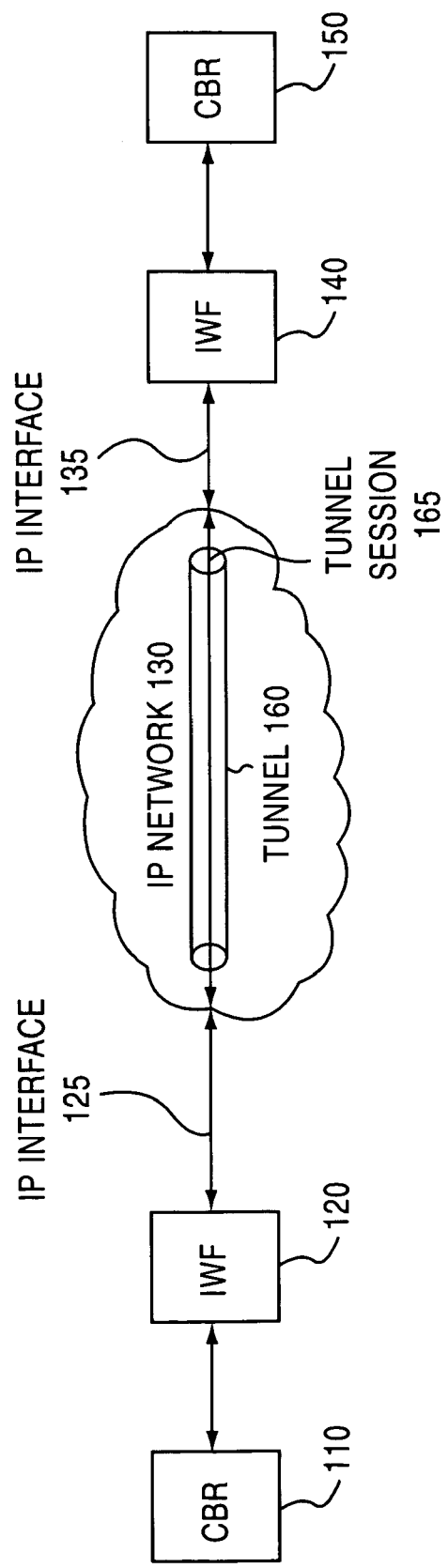
FIG. 1 illustrates one embodiment of a circuit emulation service over internet protocol (CESIP).

FIG. 1 illustrates one embodiment of a circuit emulation service over an internet protocol (CESIP) network according to the teachings of the present invention. As discussed more fully below, CESIP leverages on the many advantages of IP to provide a packet-based network solution for constant bit rate data transmission such as voice and video. Like CES over ATM, CESIP is intended to emulate the circuit-based characteristics of, for example, time division multiplexing (TDM) traffic.

In the illustrated embodiment, constant bit rate (CBR) circuits 110 and 150, interworking functions (IWFs) 120 and 140, and IP network 130 are coupled as shown. CBRs 110 and 150 represent any of a number of data sources having any of a number of signaling rates. For instance, CBR circuits 110 and 150 may represent any type of data traffic, such as video, digitized voice, frame relay, etc., between individual users, local area networks, internet service providers, or virtually any other entity or combination of entities.

Those skilled in the art will be familiar with various signaling rates, such as structured and unstructured digital signal levels DS1, DS3, and NxDS0, and the European equivalents E1 and E3. For instance, a DS1 circuit can support 24 simultaneous 64 Kbps signals, a DS3 circuit can support 28 DS1s, and an NxDS0 can support N channels of 64 Kbps each. CBR circuits 110 and 150 may also represent logical digital signal equivalent interfaces, such as interfaces that convert synchronous transport signals (STS1) into DS3 or virtual tributary (VT1.5) into DS1.

As an overview, IWF 120 and IWF 140 exchange data to establish the CESIP in IP network 130. In various embodiments, a request to establish the CESIP can come through a CBR circuit itself, over a signaling channel, through a management system, etc. Once the CESIP is established, CBR circuit 110 begins providing a data stream to IWF 120 at a constant bit rate. IWF 120 encapsulates the data into IP packets, attaches a predetermined CESIP header to each such IP packet, and feeds the packets into IP network 130 through IP interface 125. The packets travel through tunnel session 165 within tunnel 160 to IP interface 135. From IP interface 135, the packets arrive at IWF 140. IWF 140 reassembles the data stream from the packets and provides the data stream to CBR 150 at the constant bit rate.

Those skilled in the art will recognize that, at various places within an IP network, IP packets are often fragmented into smaller frames and eventually reassembled, wherein a payload for each frame comprises a portion of the original IP packet. As used herein, an IP packet refers to a complete packet which may be fragmented into several frames as it travels through an IP network. In which case, in the illustrated embodiment, a CESIP header is attached to a complete IP packet, and not to individual fragments of the IP packet.

CESIP is preferable to CES over ATM for a variety of reasons. For instance, IP is more widely available than ATM. The cost associated with IP hardware and service is also lower than for ATM. IP has a higher degree of interoperability than ATM in that IP can work with a wider variety of physical networks than ATM. IP's high degree of interoperability and wide availability also improve CES provisioning. For instance, providing an ATM connection from Boston, Mass. to San Jose, Calif. can take days. CES over ATM requires a permanent virtual circuit that affects the actual operational aspects of the ATM network. Numerous physical connections have to be made and verified. IP, in contrast, is homogeneous so CESIP is available almost anywhere. Anywhere that internet access is available, CESIP is available.

Also, IP provides certain features, such as compression, header encryption, and instantaneous failure recovery, that are not readily available in ATM. ATM uses fixed length cells. There is no support for compression in ATM. If useless data, such as silence, is received in a constant rate bit stream, CES over ATM will transmit the useless data. IP, in contrast uses variable length packets. Numerous forms of compression are possible in CESIP to better utilize bandwidth by recognizing useless data and not transmitting it.

Encryption is also more thorough in IP. In ATM, a header destination cannot be encrypted. With access to destination information, CES over ATM can be disrupted in numerous ways, such as flooding the destination with data until the destination fails. In IP, a destination header can be encrypted while exposed on a public network, and only decrypted while in a trusted network.

ATM is connection oriented, so a failure requires reconstruction of a connection, or rerouting, around the failure. ATM re-routing can take a comparatively long time and even cause data loss. IP, in contrast, is connectionless. For any given path, there is virtually always an alternative path. IP does not rely on a particular route. If a route fails, an alternative route is automatically used. Data is not lost. Instead there may merely be a temporary degradation in service due, for instance, to a longer alternate path through the IP network.

The fixed cell size of ATM makes ATM easier to process through a network than the variable sized packets of IP. But, IP hardware has advanced faster than ATM hardware, allowing CESIP to sustain signal rates at least as fast as CES over ATM.

The present invention overcomes a number of obstacles inherent in IP so that the many advantages of IP can be utilized for circuit emulation services. For instance, compared to ATM, ATM preserves packet order and defines a cell loss ratio through the ATM network. In which case, CES over ATM is relatively straight forward. IP packets, however, are often delivered out-of-order. In fact, IP provides no guarantee of packet delivery whatsoever. In which case, as discussed below, the present invention accounts for these and other properties inherent in IP to provide CESIP.

Figure 2:
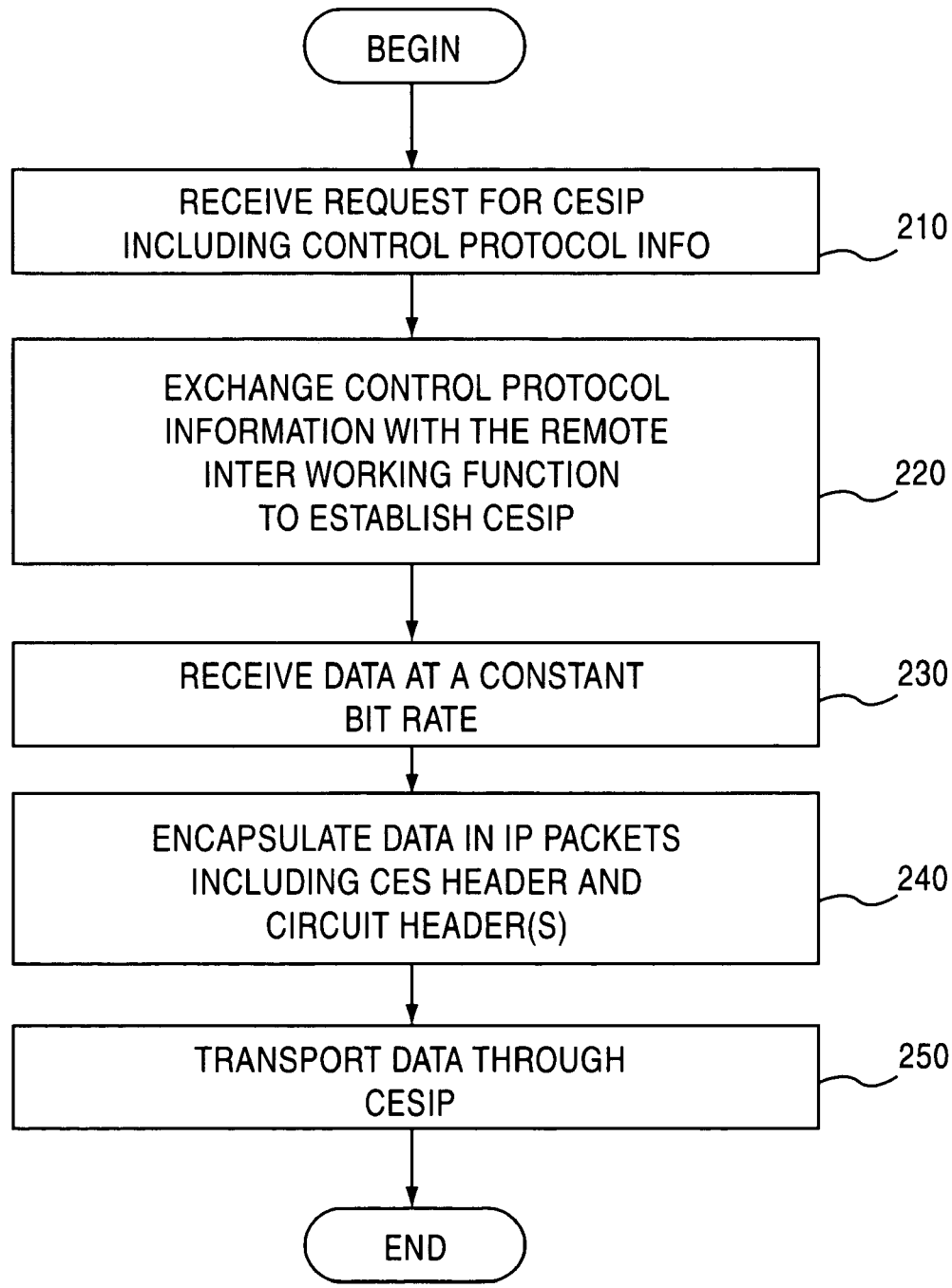
FIG. 2 demonstrates one embodiment of CESIP from a sending interworking function.

FIG. 2 demonstrates one embodiment of CESIP in more detail. In block 210, an interworking function (IWF) receives a request to establish a CESIP. For instance, from a user's perspective, this could be dialing a phone number, submitting a login name, or clicking on a link to a web page. The request can come in any of a number of formats. In one embodiment, the request is received in a user command. In an alternate embodiment, the request is received in an IP frame format. In yet another embodiment, the request is received in a network management protocol such as simple network management protocol (SNMP). In each case, the request may include all or a portion of the control information necessary to establish a CESIP. For instance, a CESIP may already be in place. In which case, the request may just include enough information to identify the remote IWF so that the local IWF can verify that the remote IWF exists on the IP network, and check on the availability of an already configured CESIP.

If a CESIP has not already been established, and the remote IWF exists, the IWFs exchange control protocol information in block 220 to establish a new CESIP. In one embodiment, CESIP builds upon an existing tunneling protocol, layer two tunneling protocol (L2TP). A tunnel transports packets across an intervening network in a way that is intended to be transparent to the end users. L2TP is described in detail in an Internet-Draft titled "Layer Two Tunneling Protocol 'L2TP,'" published June 1999, and available from The Internet Society.

Basically, L2TP is an encapsulation protocol. Data is encapsulated before entering a network and then re-assembled when leaving the network. A tunnel may include several tunneling sessions. That is, L2TP can keep track of several different bit streams between a pair of two IWFs at the same time. Each CESIP uses its own L2TP tunneling session. In alternate embodiments, any number of tunneling protocols can be used.

The control protocol for CES layers on top of the tunnel and tunnel session of L2TP. In one embodiment, the CES control protocol information includes an alarm option, a compression option, an idle pattern option, a check sum option, and a clocking option, a packet size option, a multiple circuit option, a maximum transmit delay, a maximum delay variation, and an encryption option. The CES control protocol is more easily understood in conjunction with the CESIP packet as discussed below.

Once a CESIP has been established, data is received at a constant bit rate in block 230. In block 240, the data is encapsulated into IP packets with additional headers. And, in block 250, the packets are sent through the IP network.

Figure 3:
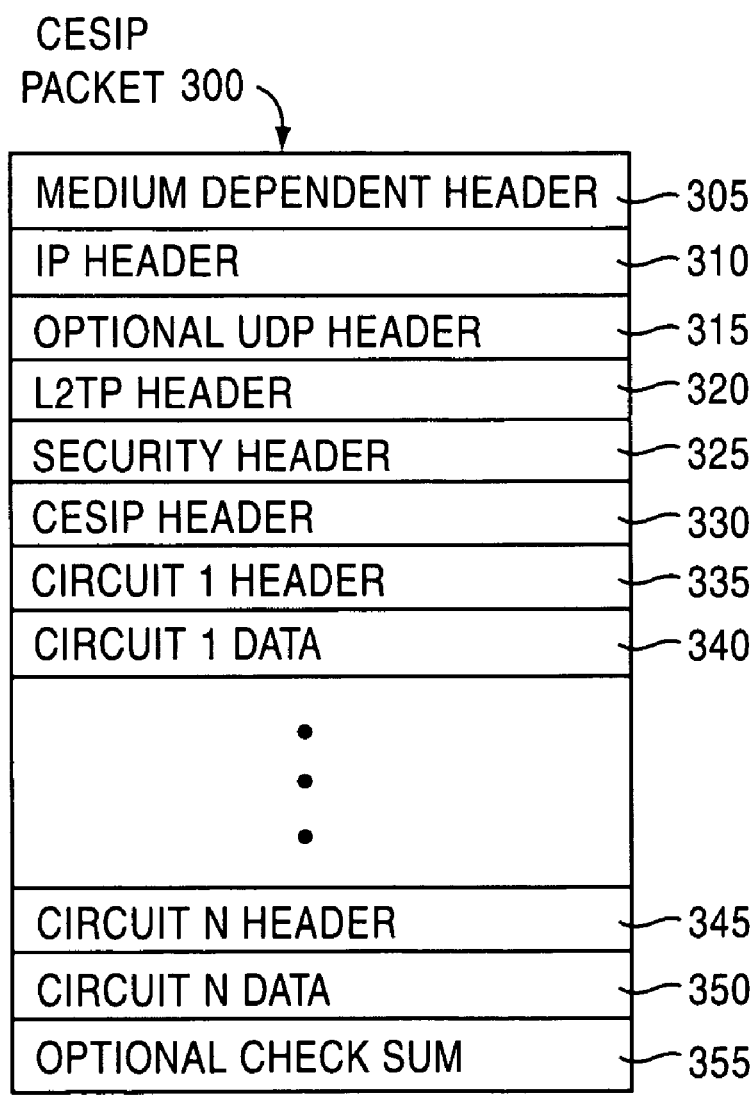
FIG. 3 illustrates one embodiment of a CESIP packet.

FIG. 3 illustrates one embodiment of an encapsulated CESIP packet 300. In the illustrated embodiment, CESIP packet 300 includes a number of known, standard headers including medium dependent header 305, IP header 310, UDP header 315, and L2TP header 320. Medium dependent header 305 depends on the underlying network. For instance, the header may be different if the physical medium is a synchronous optical network (SONET), a copper line, a coaxial cable, or a digital wireless transmission. The header may actually include more than one header such as an ATM header and a SONET line header. The header will change as the packet moves through different types of networks. For instance, each router may internetwork two different kinds of networks. So, at each router, the packet may get repackaged with a different medium dependent header 305.

IP header 310 includes a length indicator for the variable length IP packet. During configuration, the CES control protocol establishes a maximum and minimum packet length. The length may depend on how reliable the network is believed to be. That is, the physical network medium has associated with it a bit error rate, such as one bit error per X megabits. A longer packet has a higher probability of experiencing a bit error. Once a packet is corrupted by a bit error, the packet will likely be dropped. In which case, a more reliable network can support a longer packet size and still maintain a low probability of experiencing a bit error.

Following IP header 310 is user datagram protocol (UDP) header 315. If L2TP can work directly with IP packets, then UDP header 315 is optional.

Following the standard headers, the illustrated embodiment includes optional security header 325. If it is used, security header 325 may include customized security information, for instance, for authentication and encryption. Alternately, a standardized security header can be used such as the IP security header, IPSec, which includes a separate authentication header section and an encryption header section. If an IPSec header is used, it is usually located between IP header 310 and UDP header 315 in the IP packet rather than following L2TP header 320.

Following security header 325, the illustrated embodiment includes CESIP header 330. In one embodiment, CESIP header 330 contains only a version number for compatibility purposes between hardware at each IWF. Additional information pertaining to individual CESIP circuits is stored in the respective circuit entries as discussed below.

The illustrated embodiment contains N circuit entries. That is, if the multiple circuit option was enabled during the CES control protocol configuration, each packet can contain data from multiple different circuits. For instance, referring to FIG. 1, if five simultaneous data streams are being sent from CBR 110 to CBR 150 at constant bit rates, data from all five data streams can be encapsulated in one CESIP packet. Each circuit entry includes a circuit header section, such as headers 335 and 345, and a circuit data section, such as sections 340 and 350.

Enabling multiple circuits per packet can reduce overhead. For instance, less bits are needed for header information if multiple circuits are included in one packet. Also, less packets need to be routed through the network if multiple circuits are included in one packet. The drawback to packets containing multiple circuits is increased packet length. As discussed above, longer packets have a higher probability of a bit error. In which case, the option to include multiple circuits per packet, as well as the number of circuits per packet, may depend on the estimated reliability of the underlying physical network.

Following the circuit section of CESIP packet 300, the illustrated embodiment includes an optional check sum field 355. During configuration, the CES control protocol determines whether packets will include a check sum. If both users agree that the underlying network is exceptionally reliable, the check sum can be disabled to save some bandwidth. Any number of check sum formats could be used to identify various errors in CESIP packet 300.

Figure 4:
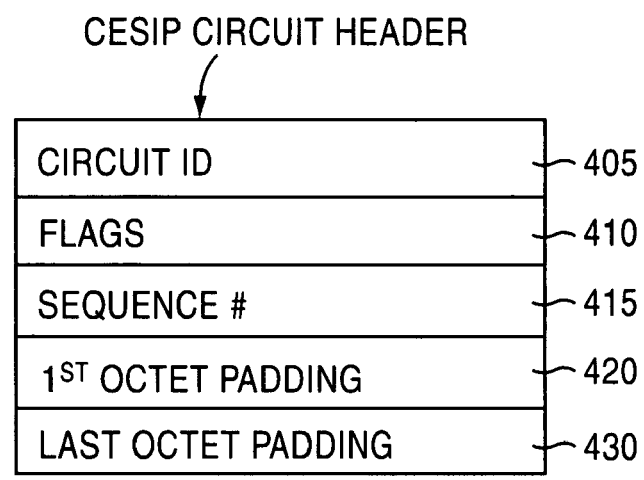
FIG. 4 illustrates one embodiment of a CESIP circuit header.

FIG. 4 illustrates one embodiment a circuit header 335 from FIG. 3 in more detail. Circuit header 335 includes circuit identification 405 to identify which circuit is being emulated. Circuit header 335 also includes flags field 410. One embodiment of flags field 410 includes a compression flag, idle flag, alarm indication signal (AIS) flag, and clocking information. All four of these flags are setup during the CES control protocol configuration. If the compression option is enabled during configuration, then the compression flag for a particular circuit in a packet is set when the circuit data has been compressed. Even if compression is enabled though, not all data is compressible. In which case, the compression flag is only set if data needs to be decompressed at the receiving end. If the compression option is disabled, no attempt is made to compress data and the compression flag is never set.

During configuration, the idle condition option determines how idle conditions are to be treated. An idle condition is usually a predetermined bit pattern that indicates no useful data is being sent. If a sending IWF receives an idle pattern in the input data stream, there is no need to transmit the idle data. Rather, the idle flag can be set to indicate an idle state and the data field for the idle circuit can be dropped off the packet. The frequency at which the packets are sent during idle can also be reduced. The reduced frequency can be set during the control protocol configuration. For instance, during normal emulation of a DS3 circuit, an IWF may send packets at a rate of 8 KHz. During idle however, the IWF may send only one packet per second. Or, in the case of a multiple circuit packet where only one circuit is idle, the idle circuit may be excluded from the packets being sent at 8 KHz and only included in one packet per second.

The alarm indication signal is similar to the idle flag. If an alarm state is detected, such as an abrupt and unexpected stall in the constant input bit stream at an IWF, an alarm pattern should be inserted into the bit stream. Rather than sending the alarm pattern in the data portion of the packet, the data portion can be dropped off and the alarm flag set. Then, the receiving IWF, which was configured by the CES control protocol with the appropriate alarm pattern, can insert the alarm pattern from the receiving end based on the alarm flag. A great deal of network bandwidth can be saved by not sending the alarm pattern over the CESIP. The alarm pattern may be different for different types of signal rates, such as DS3 and the European equivalent. An alarm flag may also reduce the transmission rate similar to the way an idle flag can reduce the transmission rate.

In one embodiment, the clocking flags will only be included if the CES control protocol configuration indicates that the CESIP is asynchronous. The clocking flags are used for clock synchronization between a pair of IWFs. Any number of clocking flag formats could be used. In one embodiment, a synchronous residual time stamp (SRTS) is used. Those skilled in the art will be familiar with clock synchronization using SRTS in CES over ATM. In one embodiment, CESIP supports SRTS in a fashion similar to CES over ATM in that CESIP uses a four bit SRTS with one bit in each alternate packet so that a complete SRTS value is obtained once every eight packets. Alternately, all of the clocking bits can be stored in one packet, or spread over more or fewer packets. In a synchronous CESIP, the clocking flags are not needed because the IWFs are already synchronous.

Returning to FIG. 4, following flag field 410 is sequence number 415. Sequence number 415 is used to reassemble the data stream from the packets of data. In an IP network, packets may take different routes and become out-of-order. The sequence number is used to reassemble the packets in data stream order. In one embodiment, sequence number 415 is an offset value for the packet of data in the stream of data with respect to some reference point. Bits in the incoming bit stream are counted with respect to a reference bit, such as the first bit in a data stream, as the bits are encapsulated. Each packet is given an offset value equal to the bit number of the first bit in the packet with respect to the reference bit. As discussed below with respect to FIG. 6, at the receiving IWF, the packets are buffered so that out of order packets can be assembled in order.

In one embodiment, the offset number is 32 bits. In which case, the offset number wraps around to zero after more than 4 Gbits of data. So, as long as an out-of-order packet does not arrive more than 4 Gbits late, the receiving IWF will either be able to fit it in to the data stream or identify it as an old packet that should be dropped.

In FIG. 4, following sequence number 415 is first octet padding 420 and last octet padding 430. These two values are used to maintain byte alignment in the data encapsulated in the packet. For various reasons, processing speed is increased if byte alignment is maintained. During encapsulation however, packets may not begin and end on byte boundaries, so bits are often added at the beginning and end of the data portion of a circuit within a packet to maintain byte alignment. Therefore, to prevent the padded bits from being added to the output data stream, padding value 420 indicates how many bits in the first byte of the data portion of a circuit are not part of the data stream and padding value 430 indicates how many bits at the end of the last byte of the data portion of the circuit are not part of the data stream so that the bits can be skipped.

Those skilled in the art will recognize that any number of additional approaches can be used to maintain byte alignment. For instance, if the data stream is encapsulated in a byte aligned manner, every bit in a data field will be fill by the data stream so that the padding values 420 and 430 can be excluded from the circuit header format.

Figure 5:
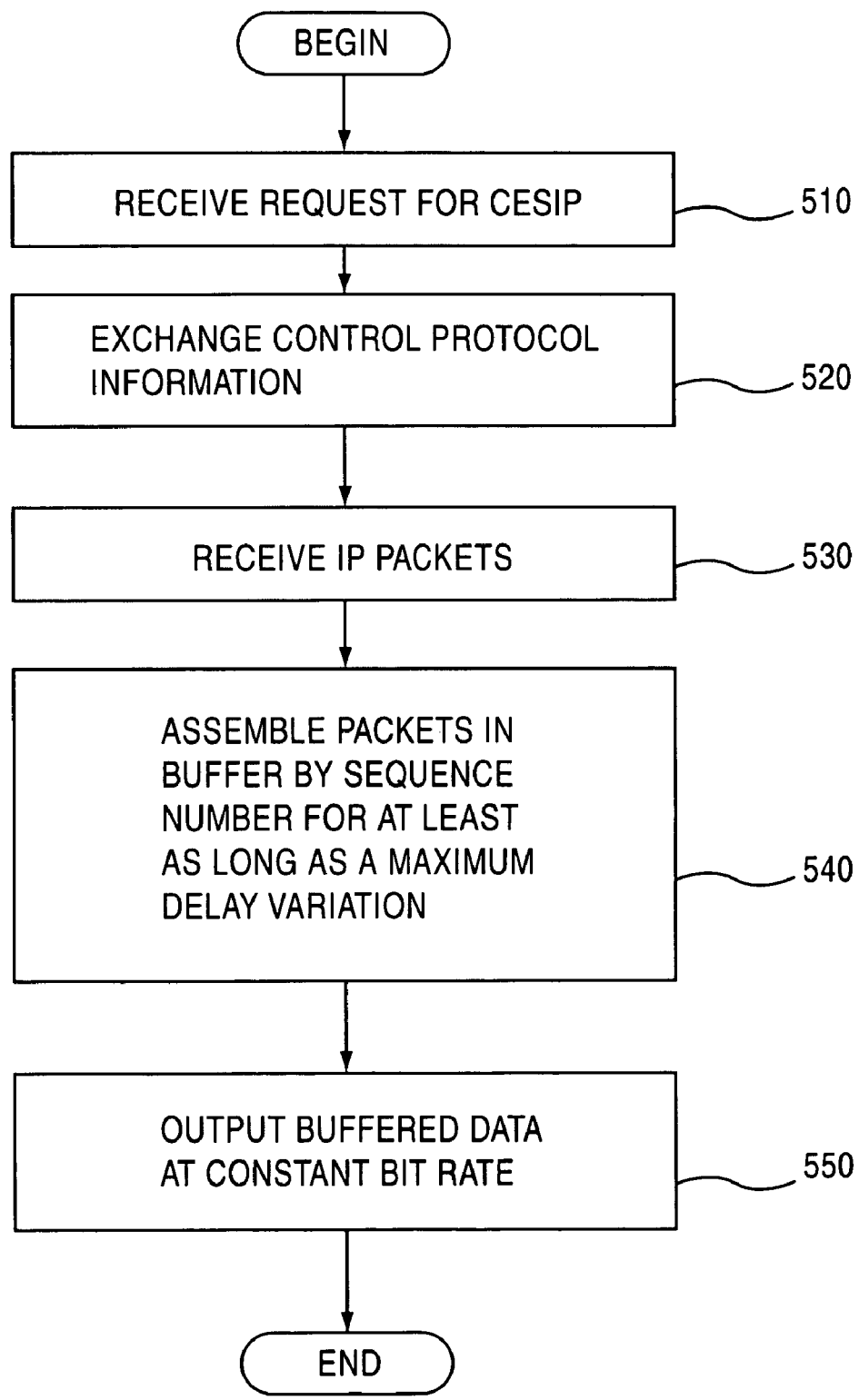
FIG. 5 demonstrates one embodiment of CESIP from a receiving interworking function.

FIG. 5 illustrates one embodiment of a CESIP from the perspective of the receiving interworking function (IWF). In block 510, a request is received to establish a CESIP. For instance, this request can be received over the IP network as an IP packet. In block 520, the same control protocol information is exchanged as discussed above. In block 530, packets are received. As discussed above, the packets may include data from multiple circuits. In block 540, the packets are assembled in a buffer based on the sequence numbers in each circuit header, and in block 550 the buffered data is delivered at the constant bit rate.

Figure 6:
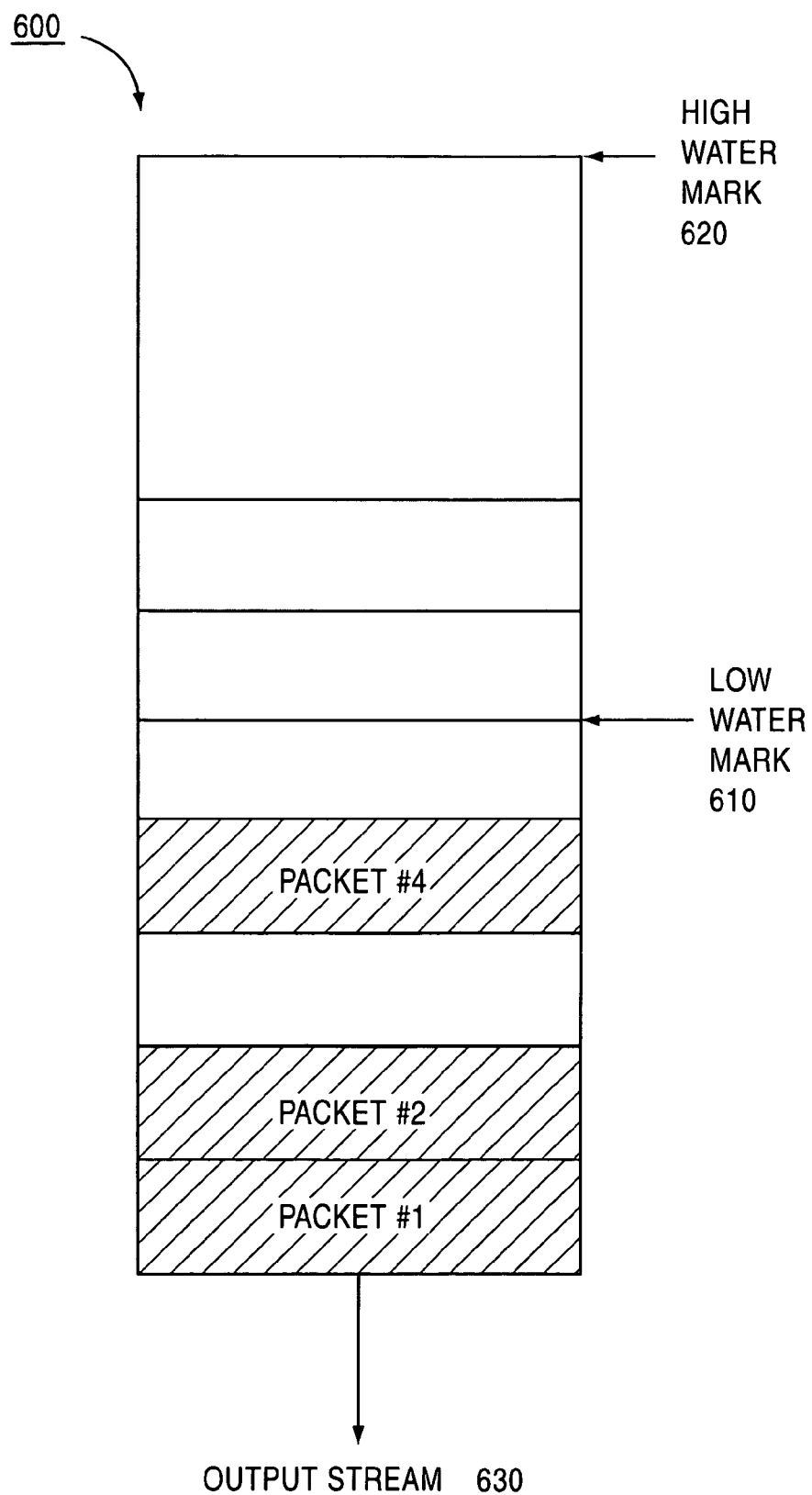
FIG. 6 illustrates one embodiment of a re-assembly buffer.

FIG. 6 illustrates one embodiment of a buffer to reassemble a circuit. The packets cannot be buffered for an extended period of time. For instance, for voice communications, the constant bit rate data can only be delayed for up to 30 to 50 milliseconds in order to maintain a TDM quality connection. Also, buffer 600 should be short enough so that old packets can be identified using, for instance, the offset numbers discussed above. On the other hand, buffer 600 needs to store packets long enough to account for maximum delay variations. For instance, during CES control protocol configuration, a maximum delay variation is agreed upon by the IWFs, and may be in the neighborhood of 10 milliseconds.

Delay variation is dependent upon network traffic. If a large volume of traffic is passing through the network, routers are likely to have longer delays because packets have to sit in longer queues to be processed. Delay variation is also dependent upon the path that a packet takes through the IP network. Different paths usually have different propagation delays. Different propagation delays can cause packets to arrive out of order. By allowing packets to accumulate for at least as long as the maximum delay variation, the chances of loosing packets due to delay variation are greatly reduced.

In the illustrated embodiment, buffer 600 includes a low water mark 610 and a high water mark 620. Bit stream data are accumulated until low water mark 610 is reached before transmitting output stream 630. If high water mark 620 is reached, buffer 600 has overflowed. Data must be discarded if buffer 600 has overflowed. In one embodiment, the entire buffer content is discarded. Alternately, data is discarded down to below low water mark 610. If data is lost, a predetermined bit sequence can be inserted. For instance, unstructured DS3 uses a framed 1010 . . . alarm bit pattern. E3, the European equivalent, uses a 1111 . . . bit pattern.

Skipping to FIGS. 9 through 13, various embodiments of a buffer for reassembling data in a Circuit Emulation Service over Internet Protocol (CESIP) are described in more detail. As discussed above, CESIP uses an internet protocol (IP) network to emulate a time division multiplexing (TDM) circuit. TDM is synchronous. That is, for a TDM circuit, a stream of data enters the network and leaves the network at the same rate. IP is asynchronous. That is, data may enter and exit the network at different rates, and the rates may change over time. For instance, packets of data in an IP network may take different paths through the network and different paths may have different time delays. Also, depending on the traffic load in the network at any given time, delays may vary due to the length of queues and processing latencies at various routers within the network.

Delay variation in a network is referred to as jitter. A jitter buffer is used to accommodate jitter. That is, a jitter buffer stores data as the data is received at a variable rate due to jitter, and then passes the data along, usually at a more uniform rate. For instance, switches in a TDM network use jitter buffers to accommodate slight variations in clock rates throughout the network. Depending on the volume of data that a particular TDM switch handles, a switch may buffer up to one or two frames worth of data. Since data is sent at a constant bit rate in a synchronous network, when a certain amount of data is stored, it takes a certain amount of time to send the data. For instance, each frame of TDM data is usually about the equivalent of 125 microseconds. In which case, by buffering one frame of data, a switch can accommodate about 125 microseconds of clock variation in the network. If data passing through a switch becomes sufficiently unsynchronized such that the variation cannot be accommodated by the jitter buffer, a switch may insert data (bit or byte stuffing) or a switch may drop data (frame slipping).

ATM networks also use jitter buffers. A few cells of ATM data can be buffered to accommodate jitter.

Jitter, or delay variation, in an IP network is usually considerably larger than jitter in TDM or ATM. Also, in an IP network, packets can take different paths resulting in out-of-order delivery. In contrast, TDM and ATM rely on in-order delivery. So, the jitter buffer technologies used in TDM and ATM networks are inadequate to re-assemble CESIP data to provide the needed constant bit rate data stream.

The inventive jitter buffer, as briefly discussed above with respect to FIG. 6 and as described below in more detail, must accommodate the characteristics of an IP network including out-of-order delivery, comparatively large delay variation, and lost packets, while at the same time providing a particular constant bit rate data stream.

Figure 9:
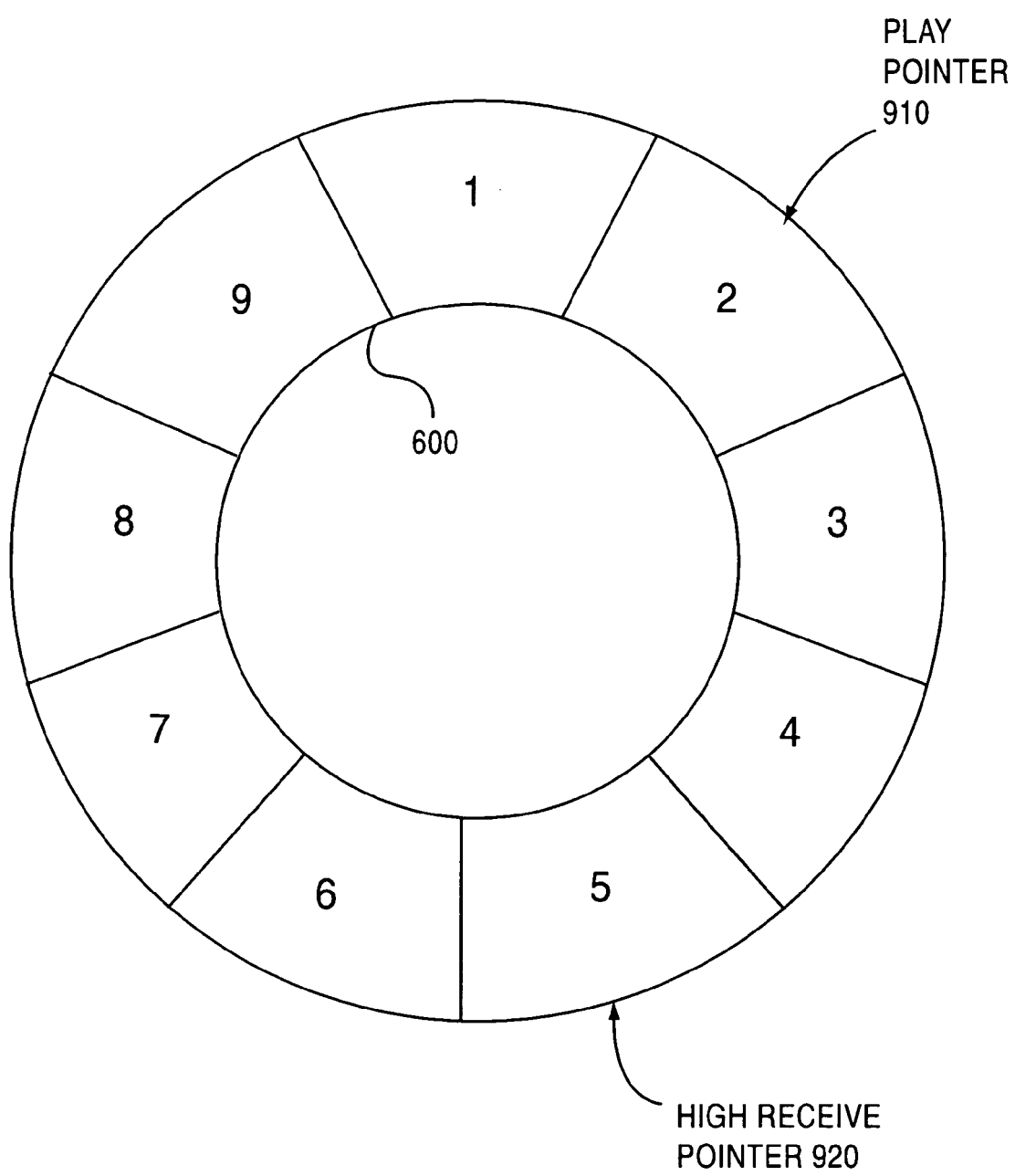
FIG. 9 illustrates one embodiment of a jitter buffer.

In FIG. 9, for purposes of discussion, jitter buffer 600 from FIG. 6 is illustrated as a circular buffer with just nine slots to store packets. As discussed below, the size of the buffer in practice is likely to be considerably larger. Also, since packets of data may have variable lengths, the buffer could be a virtual circular buffer in which, for instance, packets of data are stored at available locations in memory, and the memory locations are managed in software. In alternate embodiments, jitter buffer 600 could be embodied in hardware or a combination of hardware and software capable of handling the speed and volume of data necessary for CESIP.

In the illustrated embodiment, jitter buffer 600 includes a play pointer 910 and a high receive pointer 920. Play pointer 910 points to the next slot from which data is to be played at the constant bit rate. High receive pointer 920 points to the slot containing a packet having the highest, or "youngest," sequence number with respect to the play pointer. That is, high receive pointer 920 points to the packet that was most recently sent by the sending end of the circuit being emulated and that has also been received at the jitter buffer.

Since the sequence of slots wraps around from slot nine to slot one, high receive pointer 920 is not always technically pointing to a "higher" sequence number. It is referred to as the "high" receive pointer because when the jitter buffer is viewed as a vertical first-in-first-out buffer as shown in the embodiment of FIG. 6, play pointer 910 always points to the packet at the bottom of the buffer and high receive pointer 920 will generally point to a slot higher up on the buffer.

When viewing the jitter buffer as a circular buffer as illustrated in FIG. 9, it may be helpful to think of packets in terms of age. High receive pointer 920 points to the youngest packet of data among the stored packets, and play pointer 910 points to the oldest packet of data among the stored packets. The age of a packet is measured from the time the packet is sent by the sending end of the emulated circuit, not from the time a packet is received at the jitter buffer. Since packets can be received out of order, a newly received packet may be younger than a previously stored packet. In which case, the younger packet would be inserted into an appropriate vacant slot between play pointer 910 and high receive pointer 920 so that the data is properly re-ordered.

In various embodiments, as discussed below, the number of slots between play pointer 910 and high receive pointer 920 is used to determine when to being playing data at the constant bit rate, to detect under flow and over flow conditions, and to adjust the constant bit rate at which data is played. The number of slots between play pointer 910 and high receive pointer 920 is counted in the illustrated embodiment by starting at play pointer 910 and counting in a clock-wise direction to high receive pointer 920.

Figure 10:
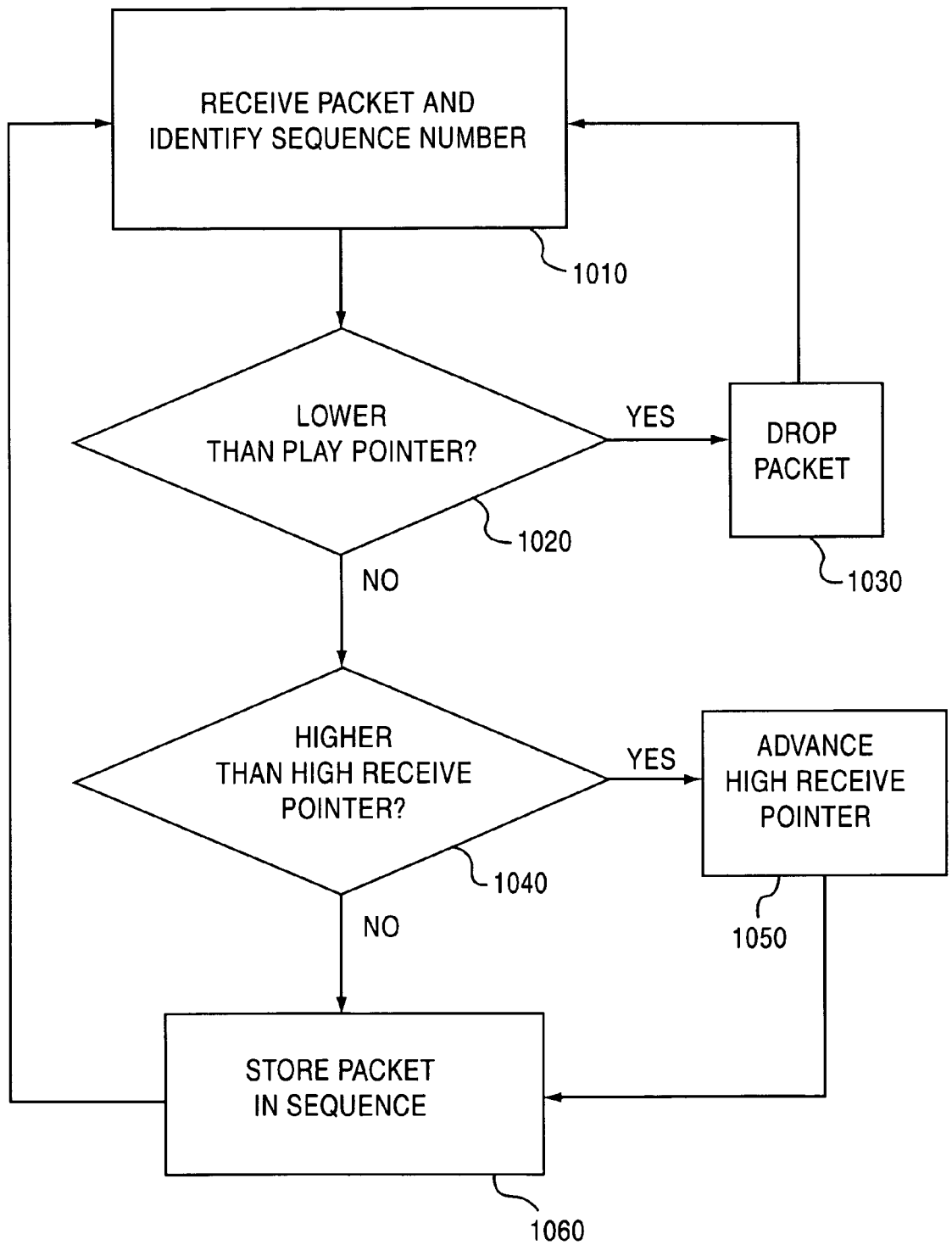
FIG. 10 demonstrates one embodiment storing packets to a jitter buffer.

FIG. 10 demonstrates one embodiment of how packets are stored to a jitter buffer. In block 1010, a packet of CESIP data is received. As discussed above, the packet includes data for one or more emulated circuits. For a particular emulated circuit, header information includes a sequence number identifying where the packet of data fits into the data stream.

For a given emulated circuit, the sequence number is compared to the play pointer in block 1020. If the sequence number is lower than the play pointer, indicating that the new packet of data belongs before the packet currently indicated by the play pointer, the packet of data is dropped in block 1030. That is, the packet of data has arrived too late to be played. Generally, if a packet is not received in time to be played, the packet is presumed to be lost and alarm data will have already been played in place of the late packet. For instance, TDM devices can handle lost data, but out-of-order data is not expected. So, when a TDM circuit is being emulated, it is usually better to simply drop late packets and let the TDM devices deal with the lost data. If a packet is dropped, the process returns for the next packet in block 1010.

If the new packet is not dropped, in block 1040, the sequence number is compared to the high receive pointer. If the sequence number indicates that the new packet belongs after the packet currently indicated by the high receive pointer, the high receive pointer is advanced in block 1050 to point at the storage slot in the buffer where the new packet will be stored.

In block 1060, the new packet is stored in the proper sequence based on the sequence number. Since packets can be received out of order, slots are left empty for packets that were sent earlier but have not yet arrived. In which case, the new packet may be stored in a slot between previously stored packets.

In one embodiment, when valid data is stored in a slot, a valid bit associated with the slot is set. As discussed below, when the data stream begins playing a new slot of data, the valid bit is checked to determine if alarm data should be played for a missing packet or if valid data is available to be played.

Figure 11:
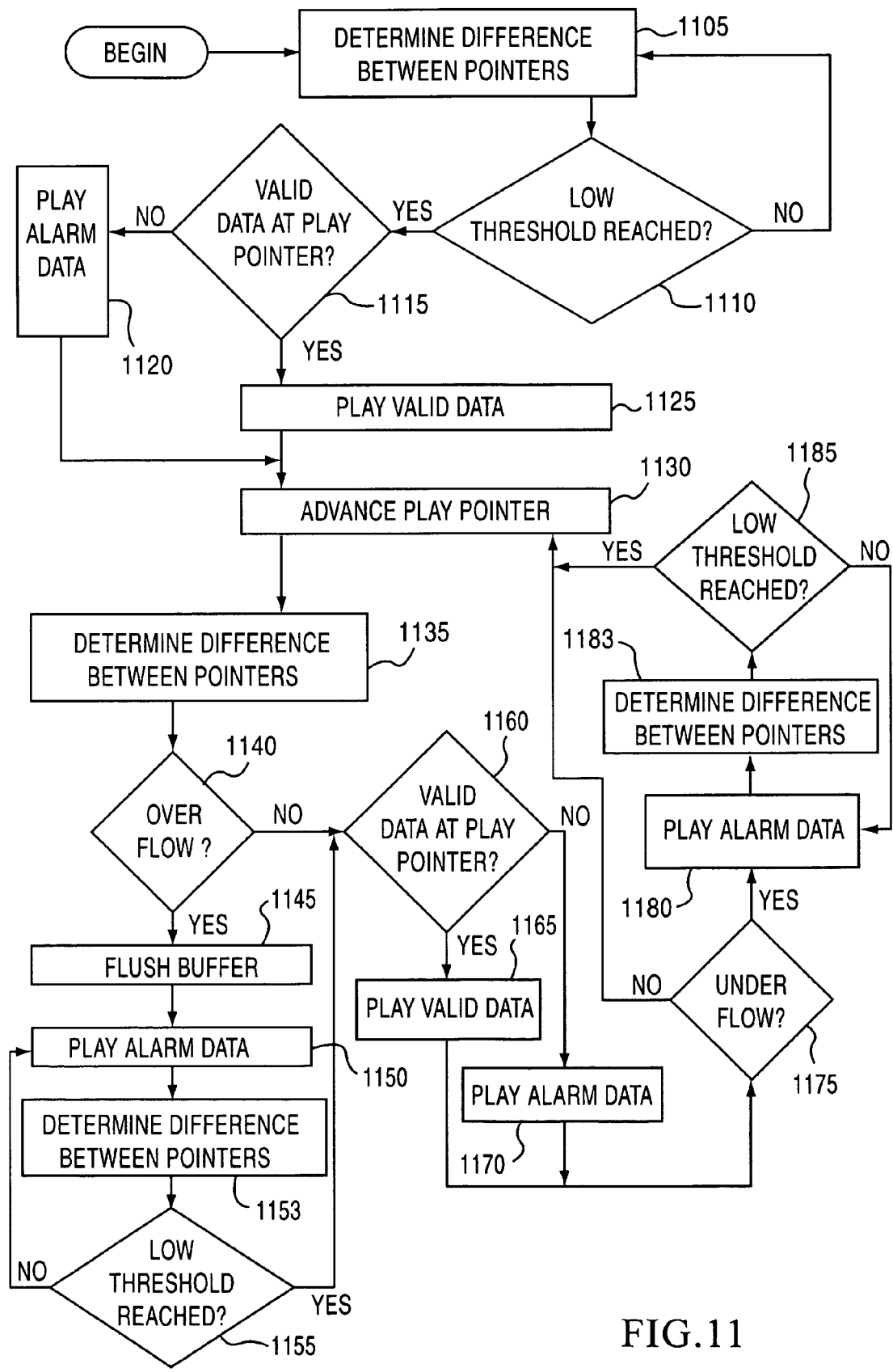
FIG. 11 demonstrates one embodiment of playing packets from a jitter buffer.

FIG. 11 demonstrates one embodiment of how data is played from a jitter buffer. In block 1105, the difference between the play pointer and the high receive pointer is determined. In block 1110, the difference between the pointers is compared to a low threshold. In FIG. 6, the low threshold was referred to as low water mark 610. Starting from an empty buffer, the low threshold indicates how much data should be accumulated before beginning to play data at the constant bit rate. That is, enough data should be accumulated so that data is available to be played for at least as long as the expected delay variation, or jitter, of the IP network. Once the data begins to be played, assuming the expected delay variation is not exceeded, enough data should continuously be available to play the data at the constant bit rate. If the low threshold has not been reached, the process loops back through block 1105 to wait for enough data to accumulate.

As discussed above, as new packets are stored to the buffer, the high receive pointer is advanced and the difference between the play pointer and the high receive pointer increase. At some point, the low threshold will be reached in block 1110, and the process will continue on to block 1115.

In block 1115, the slot to which the play pointer currently points is checked for valid data. As discussed above, in one embodiment, a valid bit associated with the slot is set if a packet of data is stored in the slot. If no packet of data is stored in the indicated slot, alarm data is played in block 1120. If valid data is stored in the slot, the valid data is played in block 1125.

After the data is played, the play pointer is advanced to point to the next slot in block 1130. In block 1135, the difference between the play pointer and the high receive pointer is determined again. While data is being played, the high receive pointer may or may not have been advanced one or more times if new packets of data have been received.

In block 1140, the difference between the pointers is compared to a high threshold to determine if an overflow condition has occurred. In FIG. 6, the high threshold was referred to as a high water mark 620. The high threshold is the maximum number of packets that the jitter buffer can store. Or put another way, the high threshold is the maximum allowable number of slots between the play pointer and the high receive pointer. The buffer size is constrained by the high threshold to prevent data from becoming stale. That is, a circuit that is being emulated has associated with it a number of quality of service parameters. One of those parameters is the maximum delay that can be introduced between the time a packet is sent and the time a packet is received. Data stored in the jitter buffer is played at a constant bit rate. So, the high threshold defines the amount of data that can be played from the jitter buffer at the constant bit rate before the maximum delay is exceeded for the last packet. In other words, if data is stored in excess of the high threshold, the excess data will be stale by the time the data is played at the constant bit rate.

A high threshold can be determined for the jitter buffer based on the difference between the expected network delay and the maximum allowable delay defined by the quality of service for the circuit being emulated. Other factors may also play a role in establishing the high threshold, including available memory and processing resources.

In block 1145, if the high threshold is exceeded, the jitter buffer is flushed to start fresh with new packets. In alternate embodiments, only part of the jitter buffer is flushed. In either case, enough data is flushed so that the receiving end of the circuit can catch up with the sending end of the circuit, to try to regain synchronization and maintaining the quality of service.

Generally, the high threshold should not be exceeded unless there is some unexpected event. For instance, the sending end may have increased the rate at which it is sending packets, or packets may be received in a burst due to some problem in the network.

Playing stale data can cause a number of problems, so it is generally better to flush data and start fresh. In a voice communication, flushing a buffer worth of data may sound like a short glitch lasting perhaps a fraction of a second. Playing stale data however, is likely to sound like an echo.

In one embodiment, the jitter buffer is flushed by clearing valid bits associated with each slot between the play pointer and the high receive pointer.

In blocks 1150, 1153, and 1155, alarm data is played, the difference between the pointers is determined, and the difference between the pointers is compared to the low threshold. That is, if an overflow condition occurs and data is flushed, no data will be available to be played. Generally, it is better to play alarm data than it is to play nothing, so alarm data is played until data accumulated up to the low threshold. For instance, in a TDM circuit a constant stream of data is expected. If there is some problem in a TDM circuit, the circuit will try to send alarm data. By sending alarm data in response to an overflow condition, the illustrated embodiment emulates the behavior of real TDM circuit.

In block 1160, if no over flow has occurred, or if an over flow has occurred but the low threshold has been reached, the slot to which the play pointer currently points is checked for valid data. If no valid data is stored, alarm data is played in block 1170. If valid data is stored, the valid data is played in block 1165.

In block 1175, an under flow condition is checked based on the difference between the pointers. That is, if the difference is zero and the pointers point to the same slot, then the jitter buffer has under flowed and is now empty. As with the over flow condition, blocks 1180, 1183, and 1185 play alarm data, determine the difference between the pointers, and check the low threshold until enough data has accumulated. Generally, the jitter buffer should not under flow. An under flow condition usually indicates some kind of problem, such as a problem with the network or an unexpected bit rate at the sending end of the circuit being emulated.

Once data has accumulated up to the low threshold, or if no under flow condition occurs, the process returns to block 1130 and the play pointer is advanced to the next slot.

In summary, in the illustrated embodiment, data is not played until data is accumulated up to the low threshold. Once data begins playing, it will continue to be played until the buffer over flows or until the buffer runs dry, even if the level of data falls below the low threshold. Then, alarm data will be played again until data is accumulated up to the low threshold again.

In the illustrated embodiment, data is accumulated up to the low threshold as soon as the difference between the high receive pointer and the play pointer reaches the low threshold. Of course, since the high receive pointer points to the "youngest" packet of data that has been received, and packets can be received out of order, data may not have actually filled in all of the slots up to the low threshold. That is, one or more slots between the play pointer and the high receive pointer may be empty at the time data begins being played. Since the low threshold is based on the expected delay variation for the network, most slots will be filled in as play progresses under normal circumstances.

In various embodiments, a slot may have a fixed size or a variable size. For instance, a hardware jitter buffer may have fixed slot sizes, and a software or software/hardware jitter buffer may have variable sized slots. Various addressing techniques can be used so that one packet fits in one slot, multiple packets fit in one slot, or a single packet occupies multiple slots. For instance, where the high receive pointer indicates a first packet that occupies multiple slots and the next packet in the sequence is received, the high receive pointer can be advanced for each slot occupied by the first packet so that the pointer indicates the slot occupied by the next packet. In one embodiment, the number of slots occupied by one variable length packet is determined based on both a sequence number and packet length indication.

If a packet contains data for multiple emulated circuits, one embodiment of the present invention uses a separate jitter buffer for each circuit. In which case, the packet payload is divided into data segments and the segments are directed to appropriate jitter buffers. Rather than working at the packet level as described in FIGS. 10 and 11, the processes can be similarly applied at a data segment level.

In alternate embodiments, one or more of the blocks illustrated in FIGS. 10 and 11 may be combined, performed in a different order, or skipped altogether. Those skilled in the art will also recognize that any number of approaches can be used for functions such as advancing pointers, flushing the buffer, detecting valid data in slots, etc.

FIG. 12 illustrates one example of CESIP data reassembly using processes similar to those of FIGS. 10 and 11 and a jitter buffer similar to the jitter buffer of FIG. 9.

At time T0, the jitter buffer is empty. The play pointer points to slot one. The high receive pointer also points to slot one. No data has been received. No data is being played. The number of slots between the pointers is zero.

The low threshold for the circuit being emulated is four slots between the play pointer and the high receive pointer. Since the low threshold has not been reached at time T0, the jitter buffer is waiting for data to accumulate.

The high threshold is eight slots between the play pointer and the high receive pointer. That is, if eight slots separate the play pointer and the high receive pointer, the data indicated by the high receive pointer will be stale by the time the data is played at the constant bit rate. Obviously, at time T0, no data has been received, so the high threshold has not been exceeded.

The range of sequence numbers for packets is nine. That is, the sending end on the circuit being emulated will number packets one through nine before wrapping around to number one again. The jitter buffer also includes nine slots to re-assemble the data stream. In alternate embodiments, the range of sequence numbers may not be the same as the number of slots in the jitter buffer. The range and number of slots are equal in the illustrated embodiment merely to simplify the description so that a packet with a sequence number 1 is stored in slot 1, packet 2 is stored in slot 2, and so on.

In practice, the sequence range and the number of slots are likely to be much larger. In one embodiment, the present invention is used to emulate a TDM service at an OC-12 rate which comprises 12 digital signal, level 3 (DS-3) transmissions. Each DS-3 comprises 28 digital signal, level 1 (DS-1) transmissions which each comprise a transmission rate of 1.544 megabytes per second. At the OC-12 rate, the present invention can emulate 336 circuits, each at a constant bit rate of 1.544 megabytes per second. To handle this volume of data, a memory bandwidth of approximately 150 megabytes per second is needed.

With this volume of data, each circuit is likely to have many packets of data outstanding in the network at any one time. In which case, a large sequence number range would be needed in order to ensure that no two packets outstanding in the network have the same sequence number. That is, if two packets have the same sequence number when they are outstanding in the network, there is a chance that the packets will be received out-of-order due to delay variation and alternate paths through the network. In which case, the receiving end will not be able to distinguish an old packet from a new packet if they both have the same sequence number.

In one embodiment of the invention, sequence numbers are 16 bit values, providing a range of many thousands of packets. In contrast, ATM sequence numbers are only three bit values, providing a range of eight packets. Of course, ATM sequence numbers are not used for packet re-ordering since ATM assumes in-order delivery and delay variation is comparatively small. That is, multiple ATM cells outstanding in an ATM network can have the same sequence number without causing confusion because the cells will be received in sequence.

As discussed above, the number of slots is based on the delay variation of the network, out-of-order delivery, and the bit rate at which packets are played. For a CESIP at the OC-12 data rate, a jitter buffer may have thousands of buffer slots.

Referring back to the example of FIG. 12, at time T1, packet sequence number 3 is received. That is, the third packet that was sent is the first packet to be received. Packets 1 and 2 were probably sent earlier, but due to delay variation they have not yet been received. The high receive pointer is advanced to point to the "youngest" received packet—packet 3 in this case. The difference between the play pointer and the high receive pointer is 2, which has not yet reached the low threshold of 4. In which case, data does not begin being played and the play pointer is not advanced.

At time T2, packet 2 is received. Since it has an older packet than the packet to which the high receive pointer already points, packet 2 will be stored before packet 3 in the jitter buffer. The pointers do not change. Since the pointers do not change, play does not begin.

At time T3, packet 4 is received. Packet 4 is younger than packet 3, so the high receive pointer is advanced to point to packet 4. Still, the low threshold is not yet reached, so play does not begin.

At time T4, packet 5 is received and the high receive pointer is advanced to point to packet 5. The difference between the play pointer and the high receive pointer is new 4, so the low threshold has been reached. Play begins at the slot indicated by the play pointer. The play pointer indicates slot 1, but packet 1 has not been received. Since valid data is not available on time, the packet is presumed to be lost and alarm data is played in its place.

In one embodiment, as described above, a valid bit is used to identify valid data. If the valid bit associated with a given slot is not set, alarm data is played. In an alternate embodiment, alarm data is stored in slots. If a packet is not received to over-write the alarm data, then the alarm data will be played when the time comes to play data from the slot. After a slot is played, alarm data is written back to the slot to flush old data.

Storing alarm data may be more efficient in, for instance, a hardware implementation where memory is dedicated to particular slots so that memory is not wasted by storing alarm data. Using a valid bit and generating alarm data on the fly may be more efficient where the jitter buffer is implemented in software so that more memory is available to store other data. Any number of alternate approaches can be used to play alarm data when valid data is not available.

At time T5, the play pointer is advanced to play the data from slot 2. Since packet 2 was previously stored in slot 2, packet 2 is played. Also at time T5, packet 1 finally arrives. Since packet 1 arrives late, as indicated by having a sequence number lower than the current play pointer, packet 1 is dropped.

By time T6, packets 6, 7, and 8 have arrived. The high receive pointer is advanced to point to slot 8. Data continues to be played at the constant bit rate, so the play pointer is advanced to play packet 3. The number of slots between the high receive pointer and the play pointer is 5.

At time T7, the play pointer has only advanced to packet 4 since play continues at the constant bit rate. By time T7 however, four additional packets have been received. Since the range of sequence numbers is 9, the sequence wraps around. The packets are numbered 9, 1, 2, and 3.

Counting the number of slots between the high receive pointer pointing to slot 3 and the play pointer pointing to slot 4 in the nine slot buffer, the number of slots is 8. The high threshold is also 8, so the buffer is about to overflow. In which case, the buffer is flushed. That is, by the time packet 3 would be played at the constant bit rate, packet 3 would be stale. In order to prevent stale data from being played, data is dropped. In the illustrated embodiment, all of the data stored in the buffer is dropped when the high threshold is reached. Once the buffer is flushed, the buffer will play alarm data and wait for data to accumulate up to the low threshold again before playing more valid data.

As discussed above, reaching the high threshold means that something unexpected occurred, such as a problem in the network that caused a group of packets to be received in a burst, or a sudden increase in the bit rate at the sending end of the circuit being emulated.

At time T8, packet 5 is received out of order and stored in the appropriate slot, leaving a slot available for packet 4 to be inserted when and if it arrives. The high receive pointer is advanced to point to packet 5. The low threshold has not yet been reached since the jitter buffer was flushed, so alarm data is played and the buffer continues to wait for data to accumulate.

By time T9, packets 4, 6, 7, and 8 have been received and the high receive pointer has been advanced to point to packet 8. The number of slots between the play pointer and the high receive pointer is now four. The low threshold is also four, so play begins at the slot indicated by the play pointer, slot 4.

From time T10 to time T13, no packets are received, so the high receive pointer continues to point to packet 8. The play pointer advances for each packet played up to packet 8. The difference between the pointers drops from 3 to zero. At time T13, the jitter buffer is empty, or in a condition of under flow. As discussed above, the jitter buffer should not underflow unless something unexpected happens, such as a problem in the network or a problem at the sending end of the emulated circuit that interrupts the data. Once the jitter buffer runs dry, it will wait until data is accumulated up to the low threshold before playing valid data again.

At time T14, packet 9 is received, but since the low threshold has not been reached, alarm data is played and the buffer continues to wait for data to accumulate. Proceeding from time T14, under normal circumstances and assuming the buffer size and threshold levels are appropriately allocated for a give data rate and network delay variation, data will be played uninterrupted at the constant bit rate from the jitter buffer.

Figure 13:
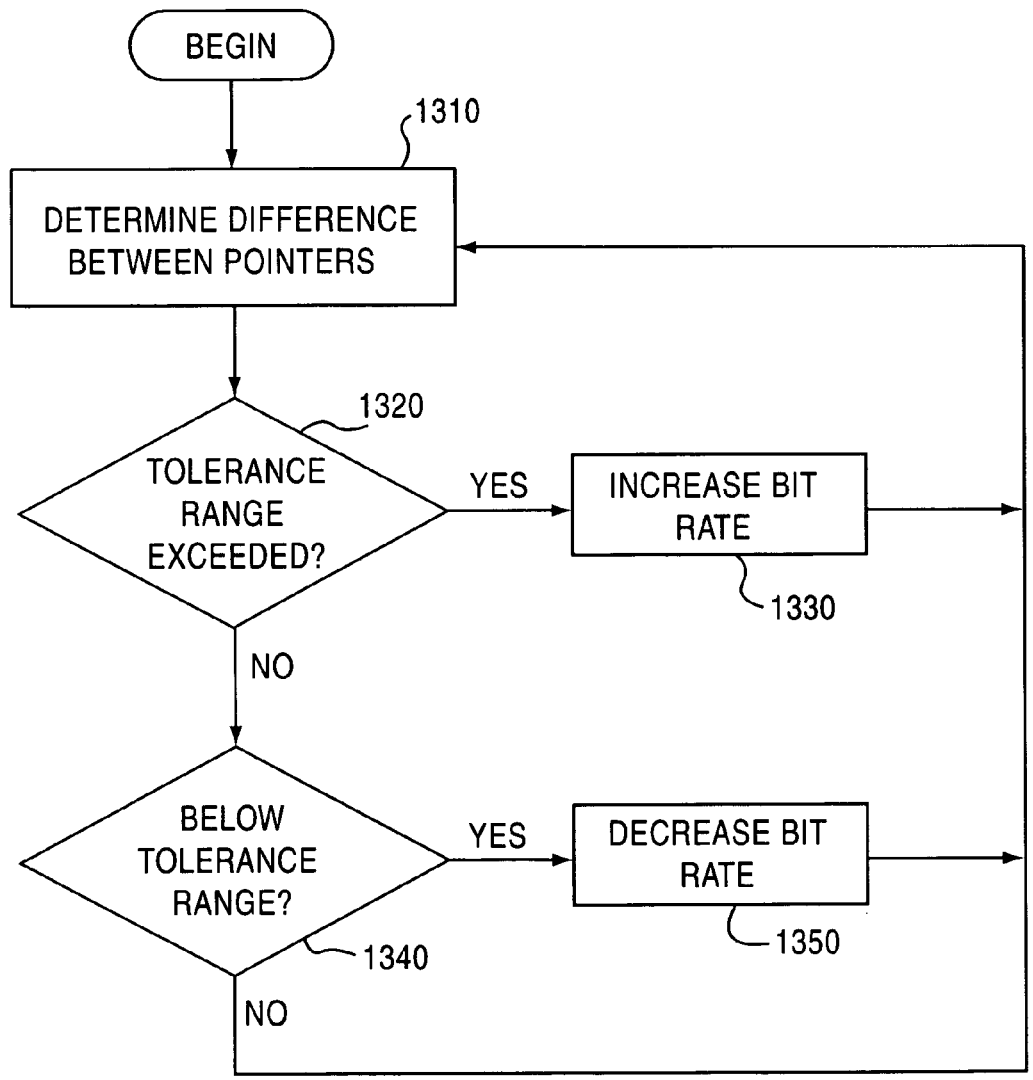
FIG. 13 demonstrates one embodiment of adjusting a bit rate.

FIG. 13 demonstrates one embodiment of the invention having an adaptive bit rate. For instance, if the receiving end of the circuit does not know what bit rate the sending end of the circuit is using, the receiving end of the circuit can adapt the rate at which the data is played to match the rate at which the data is being sent. In an alternate embodiment, TDM allows for some slight variation in bit rate over time. The adaptive bit rate scheme of blocks 1310 to 1350 can be used to emulate the variable bit rate of a TDM circuit.

A tolerance range indicates a desirable range of values for the difference between the play pointer and the high receive pointer. The tolerance range is usually centered about the low threshold and is usually considerably less than the high threshold. In various embodiments, the tolerance range can be used to measure the quality of service. For instance, if the number of slots between the play pointer and the high receive pointer is consistently within the tolerance range, then the delay variation of the network is consistently better than the expected maximum delay variation. The less delay variation there is, the better the network is operating.

In block 1310, the number of slots between the play pointer and the high receive pointer is determined. In block 1320, the difference is compared to the tolerance range to see if the tolerance range is exceeded. If the tolerance range is exceeded, the bit rate at which data is played is increased in block 1330 based on the assumption that the bit rate at which packets are being sent to the jitter buffer must be higher than the bit rate the jitter buffer is currently using. That is, rather than simply letting the jitter buffer approach an over flow condition, the jitter buffer speeds up. In alternate embodiments, several levels of tolerance ranges could be used so that the jitter buffer runs faster as the accumulated data gets closer to the high threshold.

In block 1340, the number of slots between the play pointer and the high receive pointer is checked to see if the number is below the tolerance range. If the number of slots is below the tolerance range, the bit rate at which data is played is decreased in block 1350 based on the assumption that the rate at which packets are being sent to the jitter buffer is lower than the bit rate the jitter buffer is currently using. That is, rather than letting the jitter buffer approach an under flow condition, the jitter buffer slows down. In alternate embodiments, several levels of tolerance ranges could be used to run the jitter buffer slower as the level of accumulated data drops.

In one embodiment, a variable bit rate jitter buffer can start at a typical constant bit rate and adapt faster or slower until an equilibrium is reached at which, for instance, the tolerance range is largely maintained. In which case, since the number of slots allocated for a jitter buffer depends on the bit rate at which data is played, an adaptive jitter buffer may also adjust the number of slots allocated, the high threshold, and/or the low threshold.

In various embodiments, packet routing techniques can be used to increase the likelihood that packets will follow the same path through the network and, therefore, reduce large delay variation and consequently data loss due to late packet arrival. Those skilled in the art will be familiar with routing techniques such as source routing, RSVP (resource reservation protocol), MPLS (multi-protocol label switching), and provisioned flows using a packet filter.

Figure 7:
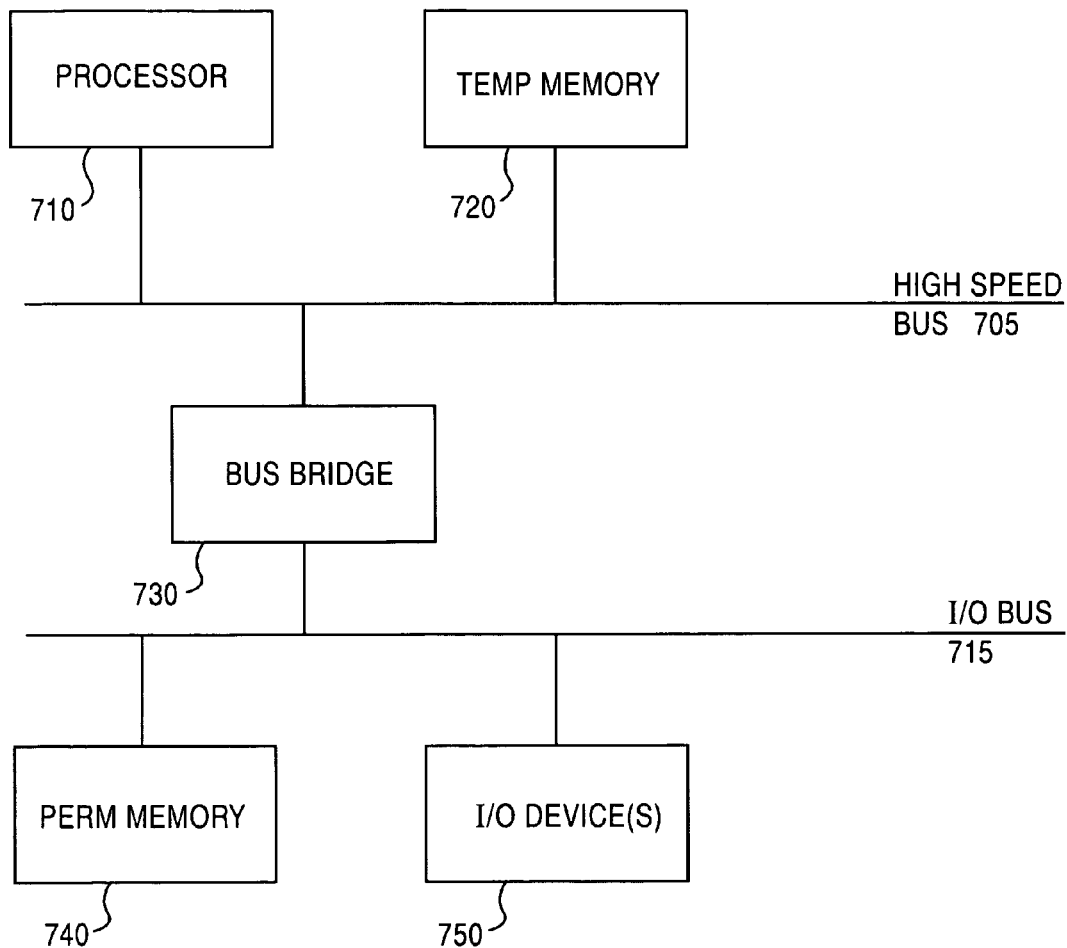
FIG. 7 illustrates one embodiment of a hardware system

Skipping now to FIG. 7, FIG. 7 illustrates one embodiment of a hardware system intended to represent a broad category of computer systems such as personal computers, workstations, and/or embedded systems. In the illustrated embodiment, the hardware system includes processor 710 coupled to high speed bus 705, which is coupled to input/output (I/O) bus 715 through bus bridge 730. Temporary memory 720 is coupled to bus 705. Permanent memory 740 is coupled to bus 715. I/O device 750 is also coupled to bus 715. I/O device(s) 750 may include a display device, a keyboard, one or more external network interfaces, etc.

Certain embodiments may include additional components, may not require all of the above components, or may combine one or more components. For instance, temporary memory 720 may be on-chip with processor 710. Alternately, permanent memory 740 may be eliminated and temporary memory 720 may be replaced with an electrically erasable programmable read only memory (EEPROM), wherein software routines are executed in place from the EEPROM. Some implementations may employ a single bus, to which all of the components are coupled, or one or more additional buses and bus bridges to which various components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

Figure 8:
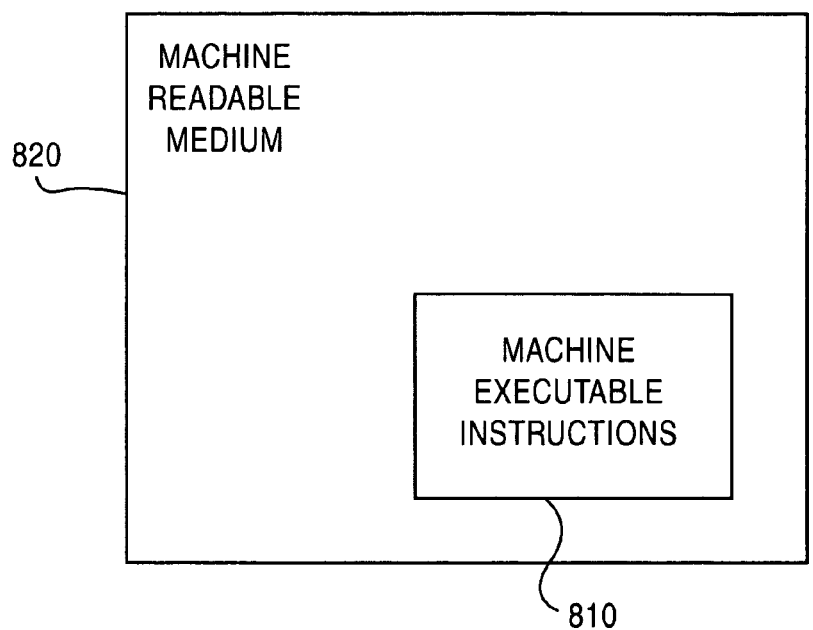
FIG. 8 illustrates one embodiment of a machine readable storage medium.

In one embodiment, the circuit emulation service over internet protocol (CESIP) jitter buffer, as described above, is implemented using one or more computers such as the hardware system of FIG. 7. Where more than one computer is used, the systems can be coupled to communicate over an external network, such as a local area network (LAN), an IP network, etc. In one embodiment, the present invention is implemented as software routines executed by the computer(s). For a given computer, the software routines can be stored on a storage device, such as permanent memory 740. Alternately, as shown in FIG. 8, the software routines can be machine executable instructions 810 stored using any machine readable storage medium 820, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device 750. The instructions may be copied from the storage device into temporary memory 720 and then accessed and executed by processor 710. In one implementation, these software routines are written in the C programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with the above described functions of the CESIP jitter buffer. In another example, the CESIP jitter buffer could be implemented in one or more ASICs on additional circuit boards and the circuit boards could be inserted into the computer(s) described above. In another example, field programmable gate arrays (FPGAs) or static programmable gate arrays (SPGA) could be used to implement the present invention. In yet another example, a combination or hardware and software could be used to implement the present invention.

Thus, a jitter buffer for a circuit emulation service over internet protocol is described. Numerous specific details have been set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description have been presented using terminology commonly employed by those skilled in the art to convey the substance of their work to others skilled in the art. Also, parts of the description have been presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations have been described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
  adjusting the first constant bit rate based on a level of buffered data packets of the first plurality of data packets;
  receiving a first plurality of data packets comprising a first circuit emulation service over internet protocol;
  buffering the first plurality of data packets; and
  playing data from the first plurality of data packets at a first constant bit rate corresponding to the first circuit emulation service over internet protocol, wherein adjusting the first constant bit rate comprises a
  increasing the first constant bit rate if the level of buffered data packets exceeds a tolerance range; and
  decreasing the first constant bit rate if the level of buffered data packets drops below the tolerance range.

2. The method of claim 1, wherein the tolerance range is based on a clock rate variation of a time division multiplexing circuit being emulated by the first circuit emulation service over internet protocol.

* * * * *